Jan. 26, 1971 J. H. BRENNAN 3,557,567
METHOD AND MEANS FOR MARKETING MEAT PRODUCTS
Filed Oct. 15, 1968 6 Sheets-Sheet 2

INVENTOR
JAMES H. BRENNAN
BY Sperry and Zoda
Attorneys

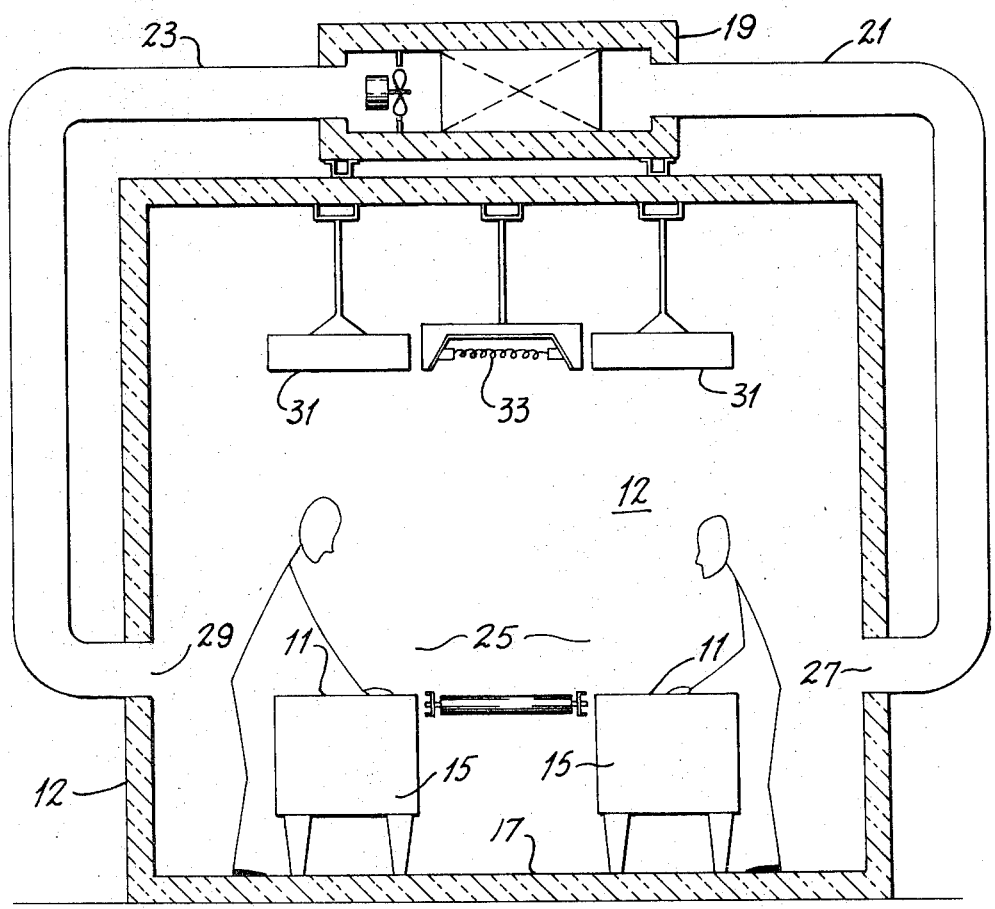
Fig_4
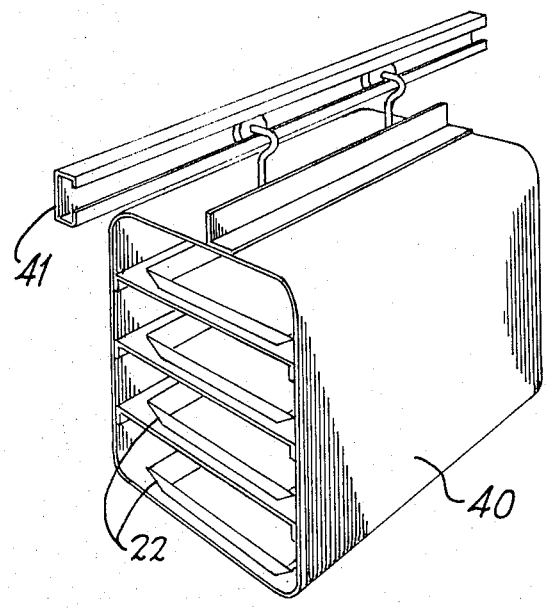
Fig_5
INVENTOR
JAMES H. BRENNAN
BY Sperry and Zoda
Attorneys

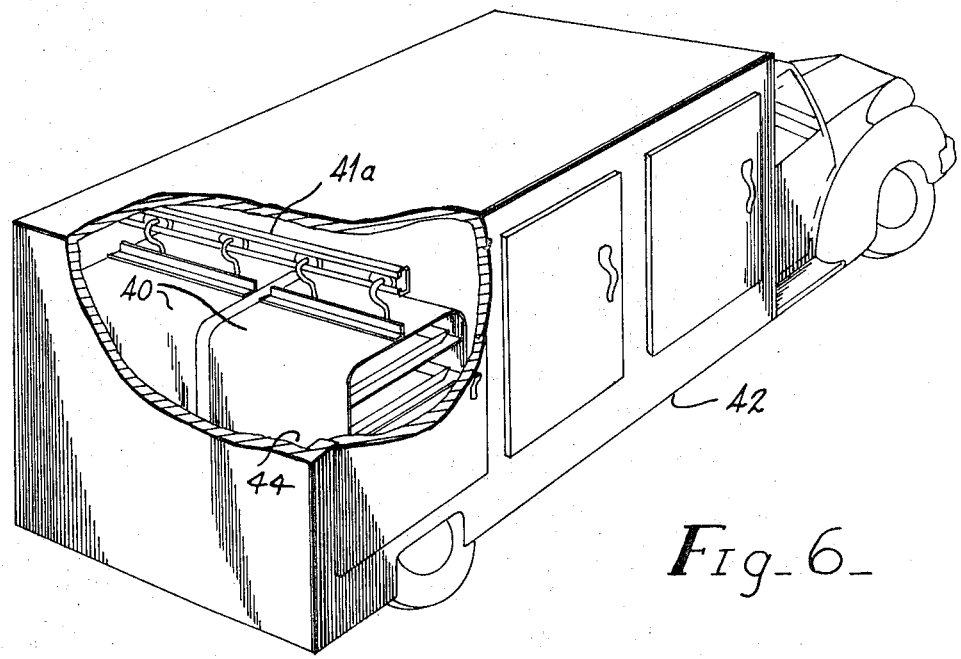
Fig_6_
INVENTOR
JAMES H. BRENNAN
BY Sperry and Zoda
Attorneys

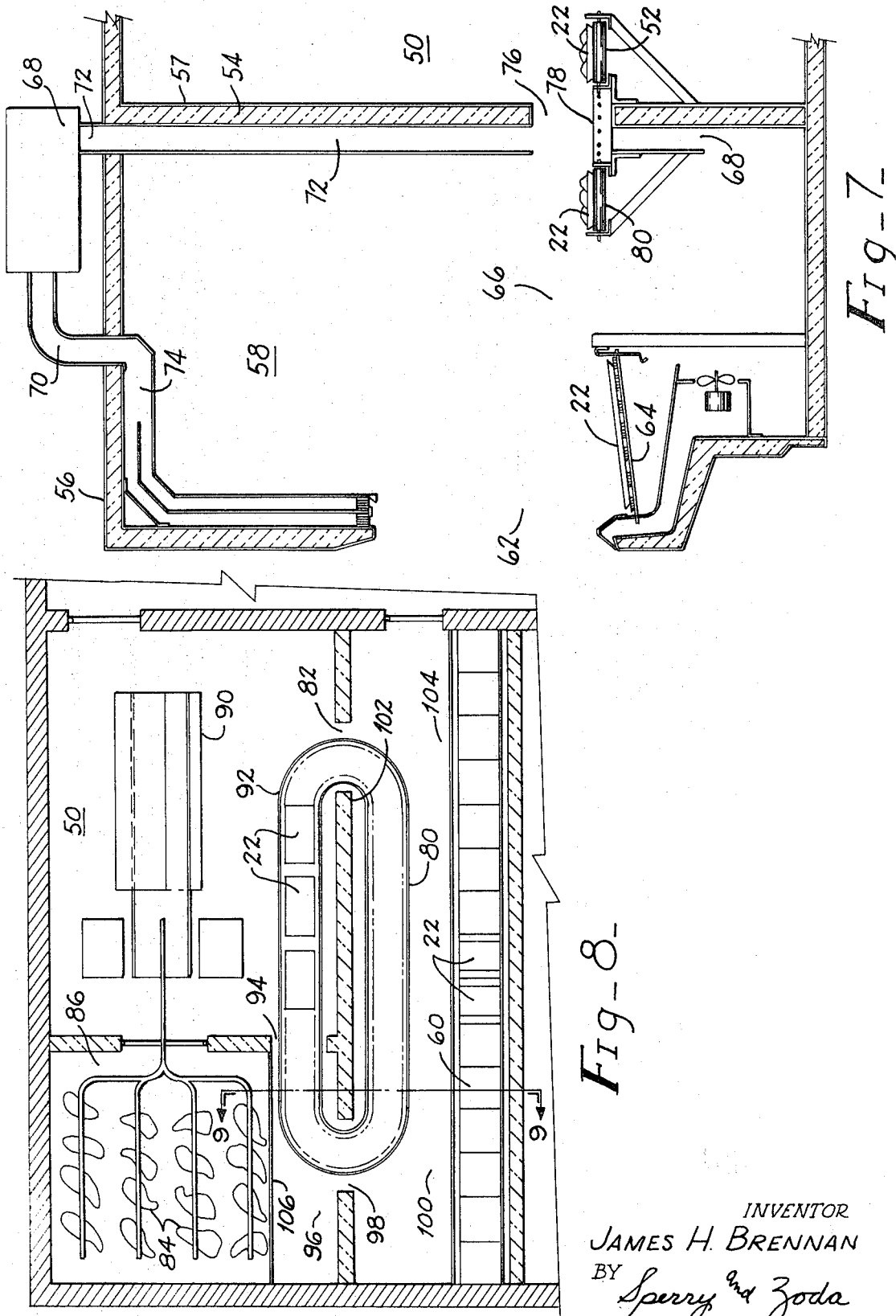

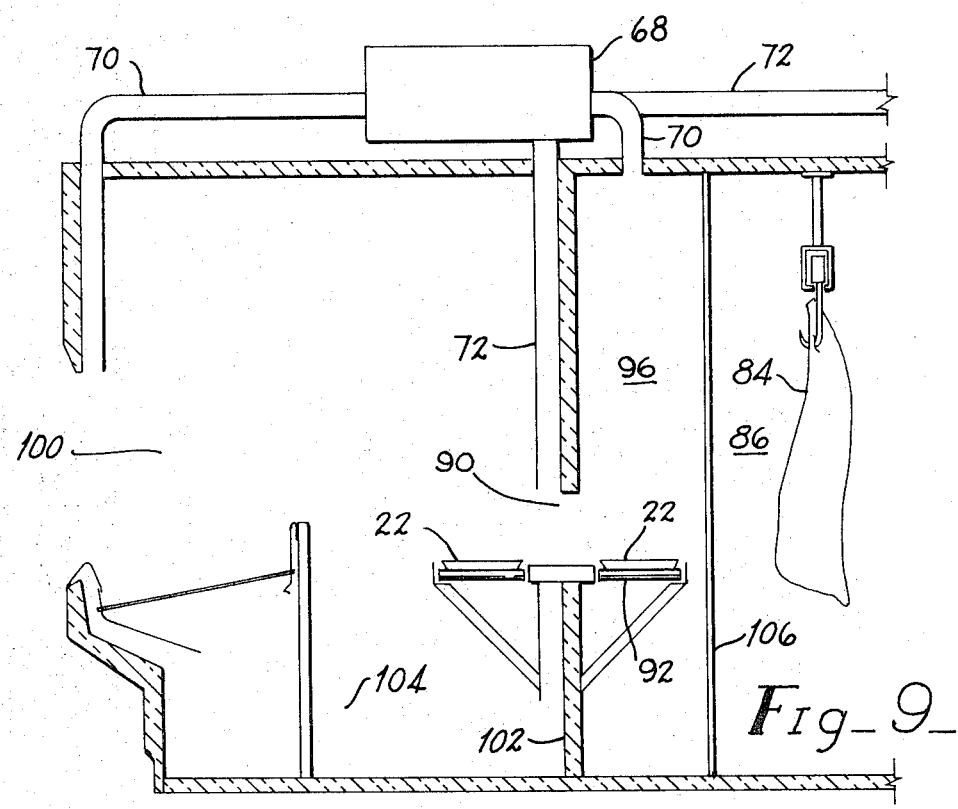
Fig_9_
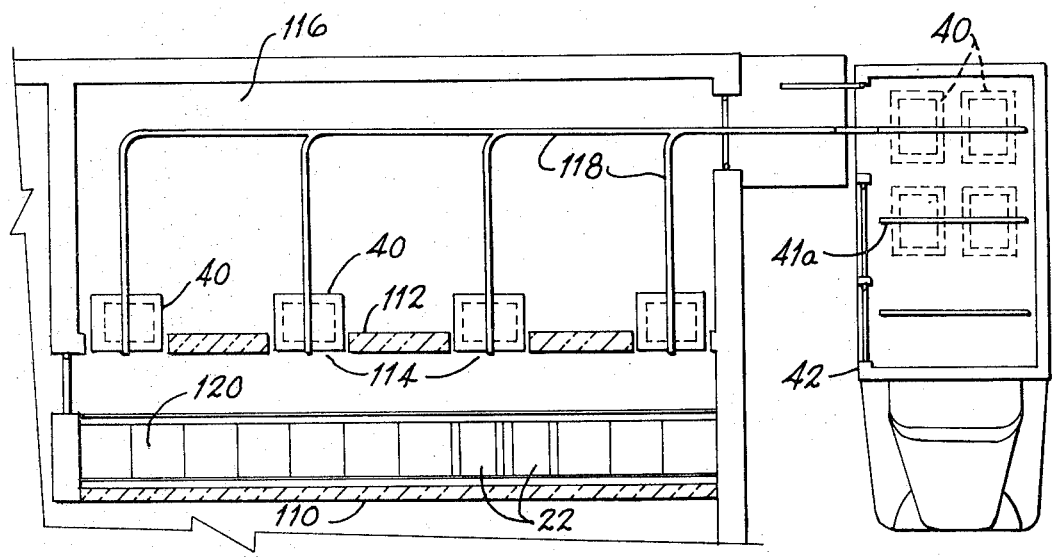
Fig_10_

United States Patent Office 3,557,567
Patented Jan. 26, 1971

3,557,567
METHOD AND MEANS FOR MARKETING MEAT PRODUCTS
James H. Brennan, Trenton, N.J., assignor to Emhart Corporation, Bloomfield, Conn., a corporation of Connecticut
Filed Oct. 15, 1968, Ser. No. 777,955
Int. Cl. F23d *25/04;* H23b *1/06*
U.S. Cl. 62—60                                            4 Claims

ABSTRACT OF THE DISCLOSURE

A system for use in the retail marketing of meats wherein the meat is maintained under continuous and uniform refrigeration at temperatures of about 31° F. during preparation, delivery and display thereof in retail outlets. For this purpose the meats are cut, wrapped, weighed and priced in a central cutting establishment and are placed on trays which are arranged on movable carts or containers. These containers whil maintained under continuous uniform refrigeration are transported to retail outlets where the carts of prepared meats are moved to locations where the trays may be transferred directly into refrigerated display equipment for sale to the customer. In this way much of the labor and space heretofore required in cutting and preparing meats for retail sale in a market is eliminated. In some instances one or more of the steps of cutting, weighing, wrapping and pricing of the meats is carried out in the retail market but in any event the meats are maintained at all times under uniform, continuous and controlled refrigeration.

FIELD OF INVENTION

The practice of cutting, weighing, wrapping and pricing meat products in retail stores or markets renders it necessary for each market to provide storage space for both bulk and cut meats and to employ a skilled meat cutter whose services are seldom required for more than a few hours a day. Furthermore, each market must be provided with expensive packaging or wrapping equipment which need be operated only for relatively short periods of time.

Of even greater importance is the fact that cut meat products deteriorate rapidly in color, appearance and quality if the temperature at which they are maintained is varied by more than 2° or 3° F. above and below a mean temperature of 31° F. However, it has not been possible heretofore to maintain any such uniformity of refrigeration when using systems and equipment of the prior art.

In accordance with the present invention, meats maintained in a refrigerated storage plant are prepared for retail sale in a central cutting establishment while remaining under continuous controlled and uniform refrigeration. For this purpose a limited number of skilled butchers or meat cutters may be employed full time and the cut meats can be weighed, wrapped and priced immediately for retail sale while still maintained under uniform temperature and while using automatic or other equipment which can be operated at full capacity. The meats thus prepared are placed on trays or the like which are arranged on carts or in portable containers movable into refrigerated trucks for transfer to retail stores or markets.

At the point of sale the carts or containers can be tarnsferred directly from the trucks into a relatively small refrigerated storage space or walk-in cooler provided with conveying means for moving the trays into refrigerated display equipment. The filled trays then may be moved from the cart or container in which they were placed at the central cutting room and be passed into the refrigerated display equipment for placement on shelves or the like in a position accessible to retail customers.

With this system it is possible to utilize skilled labor and expensive equipment much more efficiently and to utilize large areas of the market which were previously required for local cutting and packaging purposes, for the display and sale of other merchandise. Moreover, the cut meats are at all times maintained at a constant and uniform temperature of about 31° F. and can be handled under much more sanitary conditions whereby the fresh condition, color, appearance and quality of the cut meats can be preserved for much longer periods of time than has been possible heretofore.

THE DRAWINGS

FIG. 4 is a vertical sectional view through an alternative form of cutting, wrapping and article preparing room which may be employed in the practice of the present invention;

FIG. 5 illustrates a typical cart which may be employed in the practice of the present invention;

FIG. 6 is a perspective view showing a portion of a refrigerated truck which may be employed in accordance with the present invention;

FIG. 7 is a vertical sectional view of a preferred type of refrigerated display case used in the practice of the present invention;

FIG. 8 is a plan view of an alternative market arrangement which may be employed in accordance with the invention;

FIG. 9 is a vertical sectional view taken on the line 9—9 of FIG. 8; and

FIG. 10 is a diagrammatic illustration of a further modified form of the persent invention.

PREFERRED EMBODIMENTS OF THE INVENTION

Figure 1:
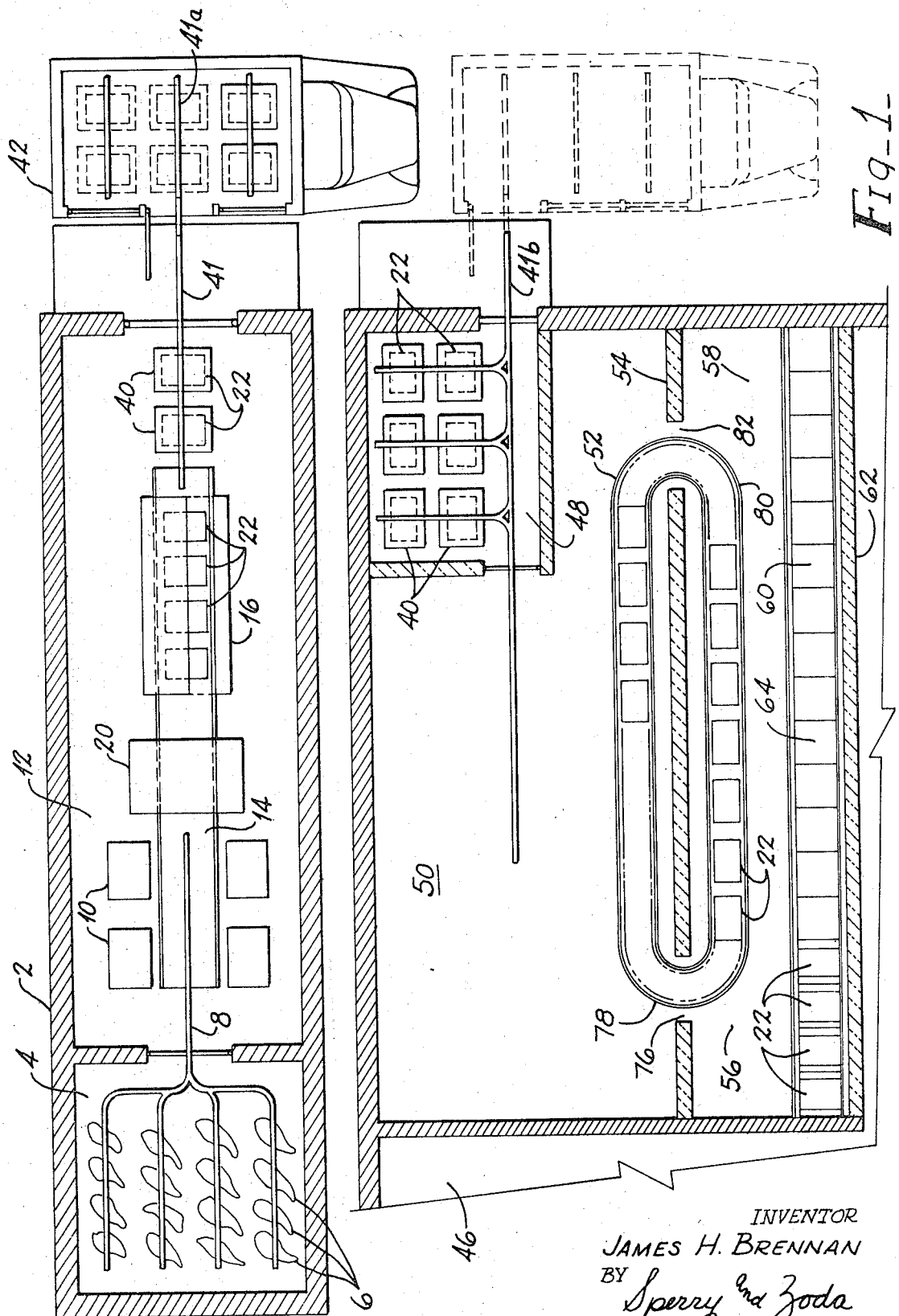
FIG. 1 is a flow diagram indicating a typical method of handling meats in accordance with the present invention.

In the embodiment of the invention illustrated diagrammatically in FIG. 1, a central meat handling plant 2 is employed for the preparation of cut meats to be sold at retail in various stores or markets. For this purpose the plant 2 is provided with a cold room 4 where sides of beef and other carcasses 6 are held under refrigeration. Such bulk meat is removed from the cold room on overhead tracks 8 or the like as needed. The carcasses are placed on cutting blocks 10 or the like, located in a cutting room 12 which is maintained at a temperature of about 31° F. A conveyor 14 serves to move cut meats placed on the conveyor by the butchers working at cutting blocks 10 to carry the cut meats to a packaging table 16.

Figure 2:
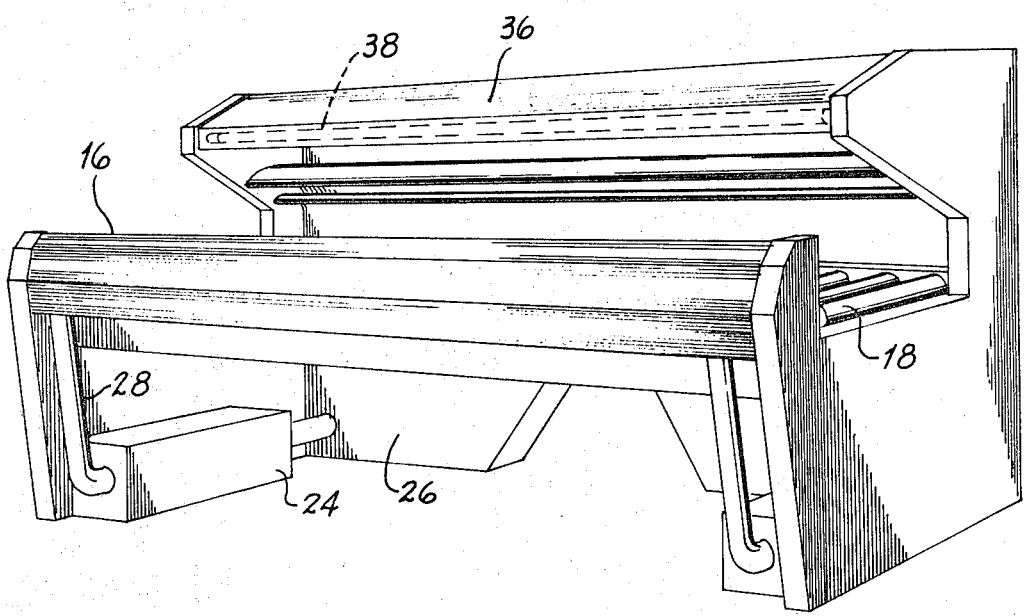
FIG. 2 is a perspective showing typical refrigerated table which may be used in cutting, wrapping and otherwise preparing meats for retail sale.
Figure 3:
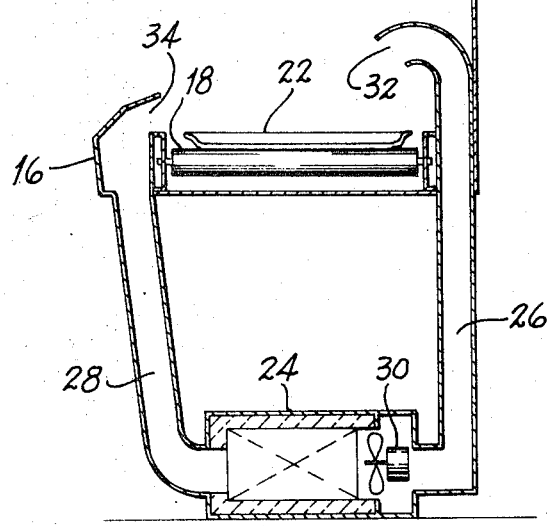
FIG. 3 is a vertical sectional view of the table shown in FIG. 2.

The packaging table 16 as shown in FIGS. 2 and 3 may also be used as a cutting table, and has a flat upper surface 18 onto which the meats pass from conveyor 14 or if desired the conveyor 14 may pass over the upper surface 18 of the table. Operators located beside the table 18 wrap, weigh, and label the cut meats. In some instances the cut meats from conveyor 14 pass to a package wrapping device 20 located between the cutting blocks 10 and table 16. In any event the cut meats are maintained at the desired uniform temperature of about 31° F. and when wrapped, weighed and labeled are arranged in trays 22 so that one tray is filled with steaks, another with lamb chops, etc.

It is possible to locate the cutting and packaging table 16 in an area maintained at normal room temperature so that the operators will work in a comfortable atmosphere. However, in that event the table 16 is provided with means for bathing the upper surface 18 of the table and the articles thereon with refrigerated air for keeping the meats at the desired low temperature during the handling thereof. Thus, a refrigerating unit 25 is located below the upper surface 18 of the table and provided with air ducts 26 and 28 which extend upward at opposite sides of the table 16. Air is circulated through such ducts and over the evaporator 24 of the refrigerating unit by means of a blower 30 so that refrigerated air will be discharged from a discharge opening 32 at the upper end of air duct 26 and be withdrawn through the return air inlet 34 of duct 28 for recooling and recirculation. In the preferred construction shown the air discharge opening 32 is located beneath a hood 36 at one side of the upper surface 18 of the table 16 so that refrigerated air will be directed downwardly onto the cut meats on the table prior to passage thereof to the return air inlet 34. A light 38 may also be located beneath the hood 36 to illuminate the cut meats and permit critical inspection thereof as they are wrapped, weighed and labeled.

Instead of using a refrigerated cutting and product preparing table such as that of FIGS. 2 and 3, it is possible to maintain the meats or other articles continuously at the desired and uniform low temperature of about 31° F. during the operations of cutting, weighing, wrapping or otherwise preparing the same while avoiding the discomfort and health hazards heretofore encountered by personnel working in rooms maintained at such low temperatures. For this purpose, the sides of beef, pork or other carcasses or bulk meat products, when removed from the cold room 4 are transferred to a cutting room 12 such as that shown in FIG. 4. This cutting room is provided with a conveyor or other working surfaces 11 which are positioned at a convenient level to permit operation thereon by meat cutters or other personnel 13 who trim, weigh, wrap or otherwise prepare the meat for retail sale. The height of the upper surface 15 of the table, conveyor or other equipment on which the meat is supported during work thereon may be anywhere from, say about, 30 to 40 inches above the floor 17 on which the operators stand.

In order that the temperature of the air surrounding the meat during work thereon will always be maintained at about 31° F., a refrigerating unit 19 is provided with an air discharge duct 21 and an air return duct 23 through which refrigerated air is circulated to and from the space 25 within the cutting room 12. The inlet 27 to cutting room 12 of the air discharge duct 21 is located at a level approximately equal to that of the working surface 15 of the table on conveyor 11, that is about 30 to 40 inches above the floor 17. The outlet 29 for the air to return duct 23 is located at about this same level. The lower portion of the cutting room 12 in which the meat is located is thus maintained at the desired low and constant temperature of about 31° F. It is also desirable to form the air inlet 27 and outlet 29 of relatively large area, so that the refrigerated air in the lower portion of the cutting room 12 will flow across the room at a low velocity so as to permit effective stratification thereof and avoid drying out of the meats during work thereon.

The upper portion of the cutting room 12, above the inlet 27 and outlet 29 for the stratified refrigerated air circulated therethrough may be maintained at a higher temperature, say 50° to 55° F. For this purpose lights 31 and heating means 33 may be located in the upper portion of the cutting room above the stratified lower refrigerated air in the cutting room. The heads and upper portions of the bodies of the workers then will not be chilled to such an extent as to make then uncomfortable or render them subject to repeated colds, sinus troubles or other health problems which might give rise to hazardous sanitation problems. At the same time the workers may wear heavy trousers, socks, boots and underwear to protect the lower portions of their bodies which are exposed to the refrigerated air circulated about the meat to maintain it at the desired constant temperature.

This stratification and control of the temperature of the air within the lower and upper portions of the room in which the meat is cut, wrapped or otherwise prepared for retail sale, assures the preservation of the meat at the required temperature needed to maintain it in prime condition whereas the comfort and health of the workers improved and the frequent loss of time of personnel working in the cutting room by reason of illness is greatly reduced.

The trays 22 on which the cut and packaged meats are placed for transfer to retail outlets are of uniform size and shape and are placed on shelves or supports in a carrier 40 supported by an overhead rail 41 as shown in FIG. 5. The carriers 40 are located in the cutting room or other space maintained at the desired uniform temperature and when filled with the trays 22 are moved into a refrigerated truck 42 which preferably is of the type shown in FIG. 6. This truck is provided with transversely extending compartments 44 of such width that one or more carriers 40 may be moved into place and supported from complementary overhead rails 41a centered with respect to the compartments. The truck is refrigerated so as to hold the cut meats at the desired uniform temperature as the truck travels from the central cutting plant 2 to the various retail stores or markets requiring a supply of cut meats, one of which is indicated at 46.

At the market 46, the carriers 40 with the trays 22 therein are moved out of the truck 42 along complementary overhead rails 41b directly into a storage room room 48 which also is maintained at a constant temperature of about 31° F. where they may remain until needed. When a supply of any particular cut of meat is required the carrier 40 having trays of such needed cut meats is moved into a service room 50 and the necessary number of trays 22 are removed from the carrier 40 and placed on a conveyor 52 which extends parallel to the rear wall 54 of the refrigerated case 56. When the carrier 40 is emptied it is returned to the central plant 2 for reuse. However, if only a portion of the trays are removed from the carrier it is returned to the storage room 48 until more of such cuts are required and all of the trays have been removed from the carrier.

The display case 56 preferably is of the display and service type disclosed in copending application, Ser. No. 693,200. As shown in FIG. 7 the display case embodies an insulated enclosure 57 having a refrigerated space 58 therein provided with a display area 60 having an access opening 62 in the front thereof and an air curtain is established for minimizing the entry of ambient air into the refrigerated space through the access opening. Article supports or shelves 64 are located in the display area 60 adjacent the access opening 62 to receive the trays 22 of cut meats. A service area 66 is located at the rear of the display area and is in continuous open communication therewith.

The display case 56 may be refrigerated in any suitable or preferred manner as for example by means shown and described in copending application Ser. No. 693,200. As there shown the refrigerating means 68 is located at the exterior of the enclosure 59 and air cooled to a constant and predetermined temperature is supplied to the equipment through a refrigerated air duct 70 while return air flows back to the refrigerating means 68 through one or more return air ducts 72 adjacent the rear wall 54 of the enclosure 57.

The air utilized in establishing the air curtain adjacent the access opening 62 is supplied from the refrigerated air duct 70 to a plenum chamber 74 whereas the return air duct 72 is located in the rear wall 54 of the case as shown in FIG. 7. An opening 76 is formed in the rear wall 54 and extends through or beside the return air duct 72 to the service area 66 of the display case. A portion 78 of the conveyor 52 extends through the opening 76 and an extension of the conveyor extends along the front side of the rear wall 54 of the case as indicated at 80.

The conveyor may be of the roller type wherein the trays 22 are supported for movement by gravity or by hand or power means along the conveyor one after another into the service area 66. The trays may then be transferred by an operator in the service area directly onto the shelves or article supports 64 adjacent the access opening 62 in the front of the display case. Empty trays may then be placed on the conveyor 80 and returned to the service room 50 of the market through a door 82 or other opening.

Within the refrigerated display case 56 the cut meats on trays 22 are maintained at a constant uniform temperature of about 31° F. so that they are continuously refrigerated without material temperature change from the time the meat is first cut, in the central plant 2 until it is actually removed from the display case 56 by a customer. As a result it has been found that the meats retain their original fresh color and attractiveness for much longer periods of time than has been possible heretofore. Moreover, a great deal of valuable space and labor is saved within the store or market and the meats and the entire establishment may be maintained in a clean sanitary condition more easily.

In those markets which already have a cold room and a cutting room the system may be organized as illustrated in FIG. 8. As there shown the meat carcasses 84 are stored in the cold room 86 and when they are to be cut they are moved into the service or cutting room 50. A cutting and packaging table 90, as shown in FIGS. 2 and 3, is located in the cutting room adjacent a conveyor 92 which extends through an opening 94 to a chill room 96 and through the opening 98 in the rear wall of the display fixture 100 where the trays 22 travel along the front side of the rear wall 102 of the fixture in the service area 104 thereof. The cutting room 88 may in the alternative be of the type illustrated and described above in connection with FIG. 4.

The chill room 96 may merely consist of an area of the cold room 86 which is partitioned off by a wall or curtain 106. Refrigerated air from the refrigerating means 68 is then passed directly into the chill room from which it passes through relatively large openings 108 into the cold room 86. The cut and packaged meats on the trays 22 can thus be cooled rapidly by a relatively high velocity draft of refrigerated air to compensate for any loss in refrigeration which may have occurred in the cutting room and while the cuts were being wrapped, weighed and labeled. While vigorous circulation of air about the meats in the cold room must be avoided to overcome any tendency to dry out the carcasses of beef and the like, the air may be circulated at a relatively high velocity through the chill room 96 and over the packaged meats since the cut meats are prevented from drying out by the material in which they are wrapped. At the same time the cubical volume of the chill room 96 is relatively small as compared with the volume of the cold room 86 where the velocity of flow of air through the openings 108 and into the cold room will be reduced and limited so as to be no more than that required to assure uniformity in the temperature of the air throughout the cold room.

In a further modification of the invention illustrated in FIG. 10 the refrigerated display equipment 110 is provided with a rear wall 112 which has a plurality of openings 114 therethrough of such size that the carriers 40 having trays 22 thereon may be removed from the refrigerated truck 42 and pushed along overhead rails 118 directly into the openings 114 in the rear wall of the display equipment. Service personnel in the service area 122 of the display equipment may then remove the selected filled trays 22 from the carriers 40 and place them on the article supports or shelves in the display area 120 of the equipment, placing the empty trays on the carrier 40 for return to the central plant 2 for reuse.

When employing the system as shown in FIG. 10, the openings 114 in the rear wall 112 of the display fixture 110 communicate directly with a storage room 116 or other space maintained at a temperature of about 31° F. in order that the cut meats on the trays 22 will be properly refrigerated while awaiting transfer to the display area 120 of the refrigerated display equipment.

In each of the embodiments of the invention shown in the drawings and described above the preparation of cut meats for display and retail sale is effected while maintaining the products at a constant and uniform temperature which has been found to preserve the fresh color, appearance and quality of the meats for a period of a week or so. As a result it is possible to effect very material savings in the trimming and rewrapping of stale or discolored meats and the need to convert high priced cuts of meat into hamburger or other ground meats for sale at lower prices is eliminated.

I claim:

1. A method for use in the retail sale of cut fresh meats wherein bulk meats are cut and prepared at a central cutting station for retail marketing while being continuously maintained at a uniform temperature within the limits of about 3° F. above and below 31° F., the meats thus prepared are placed on trays and carried by refrigerated truck to a retail outlet at a point remote from the central cutting station while still maintained at said uniform temperature, and said trays carrying the prepared cut meats are thereafter transferred from said refrigerated truck and placed on display in selfservice refrigerated equipment having an access opening in the front thereof and maintained at said uniform temperature.

2. A method as defined in claim 1 wherein the meat when cut is placed on a conveyor maintained at said uniform temperature and is transported thereby to a wrapping station which is also maintained at said uniform temperature.

3. A method as defined in claim 1 wherein the trays carrying the cut meat are placed on a movable carrier which is thereafter placed in the refrigerated truck.

4. A method as defined in claim 3 wherein the trays are removed from the movable carrier at said retail outlet and placed in position adjacent the access opening in said refrigerated equipment.

References Cited

UNITED STATES PATENTS

| 2,585,360 | 2/1952 | Williams | 62—239X |
| 3,047,404 | 7/1962 | Vaughan | 99—194X |
| 3,302,420 | 2/1967 | Morrison | 62—62 |
| 3,461,680 | 8/1969 | Rische | 62—63 |

OTHER REFERENCES

Quick Frozen Foods, February 1952, pp. 43–46 & 99.

WILLIAM E. WAYNER, Primary Examiner

U.S. Cl. X.R.

62—322; 99—194